Figure 1:
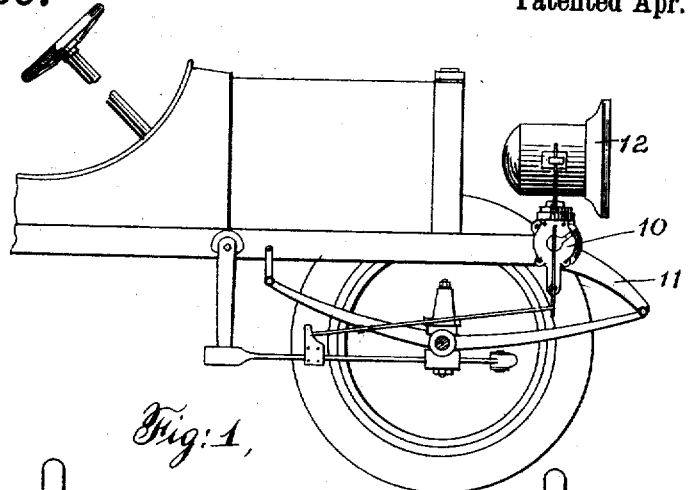

T. C. LUCE.
ADJUSTABLE BRACKET FOR LAMPS.
APPLICATION FILED MAR. 15, 1911.

1,023,259.

Patented Apr. 16, 1912.

Witnesses
Arthur G. Dannell,
Thomas T. Seelye

Thomas C. Luce, Inventor
By his Attorney,
W. C. Hutchinson.

UNITED STATES PATENT OFFICE.

THOMAS C. LUCE, OF DALTON, MASSACHUSETTS, ASSIGNOR TO LUCE MANUFACTURING COMPANY, OF DALTON, MASSACHUSETTS, A CORPORATION OF MASSACHUSETTS.

ADJUSTABLE BRACKET FOR LAMPS.

1,023,259.  Specification of Letters Patent.  Patented Apr. 16, 1912.

Application filed March 15, 1911. Serial No. 614,655.

*To all whom it may concern:*

Be it known that I, THOMAS C. LUCE, of Dalton, Berkshire county, Massachusetts, have invented a new and useful Improvement in Adjustable Brackets for Lamps, of which the following is a full, clear, and exact description.

My invention relates to improvements in lamp brackets which are adapted to be attached to automobiles or other similar vehicles, and is intended to produce a device in which the lamp support can be adjusted to different sizes of lamps, and in which the lamp itself can be laterally adjusted in relation to the vehicle and to the mud guard. Such adjustment is especially desirable in the case of a movable or rotatable lamp bracket such as is set out in my patent for lamp working apparatus, No. 981,664 dated January 17th, 1911. It will be apparent that it is necessary in the case of a movable lamp bracket that the lamp itself should be adjustable, so that when it is rotated it will not touch the mud guard or other part of the vehicle.

Another object of my invention is to produce a lamp bracket which can be secured to the frame of a vehicle in an upright position whether the bracket is attached to a level or curved part of the frame.

Reference is to be had to the accompanying drawings forming a part of this specification, in which similar reference characters indicate corresponding parts in all the views.

Figure 2:
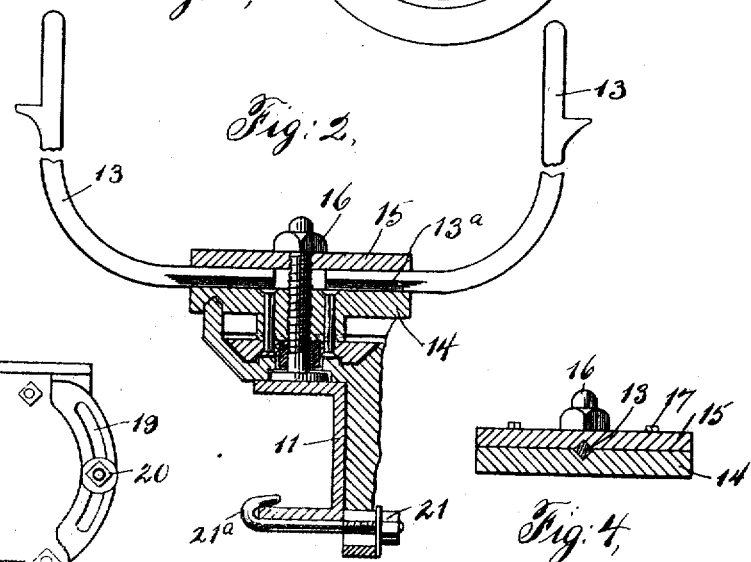
Figure 3:
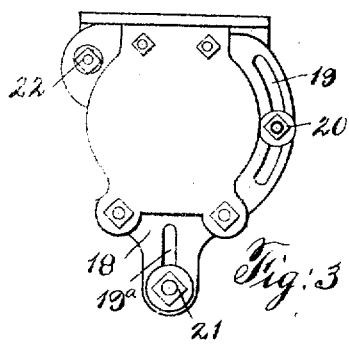
Figure 4:
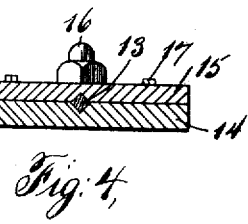
Figure 5:
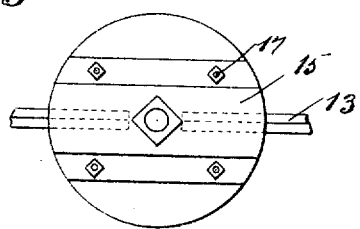

Figure 1 is a sectional elevation showing my apparatus as applied to a car. Fig. 2 is a detail sectional view of the bracket partly cut away. Fig. 3 is a side view of the body portion of the bracket. Fig. 4 is a sectional view of the clamping plates, and Fig. 5 is a top view of the top clamping plate.

In Fig. 1 of the drawing I have shown the lamp bracket 10 as secured to the frame 11 of an automobile, and supporting a lamp 12. The bracket supporting the lamp is comprised of two horns or arms 13, each having a vertical and a horizontal portion. The inner part of the horizontal portion of the arms 13 is made square in cross section for allowing of greater rigidity when clamped between the upper portion of the body portion 14 and the clamping plate 15. The clamping plate 15 is secured in place by a bolt 16 if the bracket is intended to be rotated by the steering apparatus of the vehicle, and by the bolts 17. It is apparent that the device can be attached to a rigid bracket, and in that case the bolt 16 would be omitted. As these arms 13 are held in position by the clamping plates, it is apparent that they can be adjusted to fit any size of lamp, and also that they are capable of adjustment laterally in relation to the vehicle itself.

As the frame 11 varies in shape in different makes of cars, it is necessary that the lamp bracket should be capable of adjustment to different curves so that it will always be supported in a vertical position. In order to accomplish this, I secure the bracket to the frame by clips 20, 21 and 22. These clips have hooked ends adapted to engage the inner edges of the car frame 11. In order that the lamp may be supported in an upright position on a curved part of the frame 11, I have provided a curved slot 19 in which the clip 20 may be adjusted up or down before the nut of the clip is tightened. I also provide a slot 19ᵃ so that the clip 21 may be adjusted to frames of different widths.

It will be seen, therefore, that I have provided a very simple and cheap construction by which lamps of different sizes may be supported and their position regulated in relation to the vehicle, and in which the support itself may be vertically secured to the frame of a vehicle whether the frame is horizontal or curved.

I claim:—

1. A lamp bracket comprising a body portion, clips supported thereon and adapted to clamp the body portion to the side of a vehicle frame, a clamping plate, and a pair of horns each having a vertical and a horizontal portion and supported between the clamping plate and the body portion, each horn being slidably adjustable in relation to the clamping plate.

2. A lamp bracket comprising a body portion, clips supported thereon and adapted to clamp the body portion to the side of a vehicle frame, said clips being adjustable vertically in relation to the body portion, a clamping plate, means for securing the clamping plate to the body portion, and a pair of horns each having a vertical and a horizontal portion supported between the clamping plate and the body portion and each horn being slidably adjustable in relation to the body portion.

THOMAS C. LUCE.

Witnesses:
  MALVINA B. DU FRESNE,
  JOSEPH WARD LEWIS.